(12) United States Patent
Beaulieu

(10) Patent No.: US 7,514,621 B2
(45) Date of Patent: Apr. 7, 2009

(54) MUSICAL KEYBOARD PATTERN CARD

(76) Inventor: Linda Marie Beaulieu, 7012 Sandy Souza Way, Elk Grove, CA (US) 95758-5866

( * ) Notice: Subject to any disclaimer, the term of this patent is extended or adjusted under 35 U.S.C. 154(b) by 0 days.

(21) Appl. No.: 11/479,830

(22) Filed: Jun. 30, 2006

(65) Prior Publication Data

US 2008/0000343 A1 Jan. 3, 2008

(51) Int. Cl.
*G09B 15/00* (2006.01)

(52) U.S. Cl. .................................. 84/470 R

(58) Field of Classification Search .................. 84/478, 84/479 R, 480, 481, 479 A, 470 R, 471 SR, 84/471 R, 473–476
See application file for complete search history.

(56) References Cited

U.S. PATENT DOCUMENTS

| | | | | |
|---|---|---|---|---|
| 4,417,497 | A * | 11/1983 | Nicklaus | 84/485 R |
| 6,870,085 | B2 * | 3/2005 | MacCutcheon | 84/477 R |
| 7,084,340 | B2 * | 8/2006 | Tan | 84/477 R |
| 2002/0178896 | A1 * | 12/2002 | George | 84/477 R |

* cited by examiner

*Primary Examiner*—Kimberly R Lockett

(57) ABSTRACT

Musical Keyboard Pattern Cards designed to train musical keyboard students to learn the major/minor tonal system of scales and chords upon which Western music is based.

8 Claims, 3 Drawing Sheets

MUSICAL KEYBOARD PATTERN CARD

STATEMENT REGARDING FEDERALLY SPONSORED RESEARCH OR DEVELOPMENT

No federal sponsorship was obtained or used in the development of this invention.

BACKGROUND OF THE INVENTION

This invention pertains to the design and use of templates meant for training musical keyboard students to learn the major/minor tonal system of scales and chords upon which Western music is based.

Understanding and mastering the scale and chord system is essential to the study and learning of Western Music, as it has developed from composers such as J. S. Bach, Beethoven, Brahms, and Hindemith. The scale system is comprised of several components, including: 1) scales, 2) five-finger patterns, 3) chords, 4) inversions of chords, and 5) cadences.

A musical scale is a pattern of musical notes that can be repeated up and down the keyboard. Each scale is identified by its starting note and a standardized nomenclature to signify any recognized variations. Each variation of the scales has its own pattern of distances between each note. All beginners in piano study need to learn these scales if they are going to become proficient pianists. The first five notes of a scale are the basis for all chords (triads) in all twelve major and minor keys, and their alterations: diminished and augmented. For teaching these first five notes (commonly called "five finger patterns") to piano students, these scales are usually written out on music sheets, which contain a grand staff and proceed through the entire circle of 12 major and minor keys. Reading these scales on the grand staff is sometimes confusing to young beginners. The invention reveals a method for simplifying the learning process for these beginners, as well as others learning new scales.

Chords are combinations of several particular notes from a given scale played simultaneously. As with five-finger patterns, there are identifiable groupings of notes to be played for each type of chord, no matter what key the chord belongs to. The invention reveals a method for simplifying the learning process for these chord patterns as well.

Inversions are merely chords that have had their notes rearranged into a particular, but different pattern. The invention reveals a method for simplifying the learning process for these chord inversions as well.

Cadences are a sequentially played series of chords in a certain defined pattern. Different types of cadences have over time each developed a particular nomenclature based upon the sequence and pattern of chords played. The invention reveals a method for simplifying the learning process for these cadences as well.

The invention is a series of templates that can placed behind the keys on a keyboard, with an indicator at each point where a key should be played to accomplish the desired combination of keys. The novelty of the disclosed invention is that only one template is needed for any given type of combination, and the template is merely moved to the appropriate starting key and the remaining keys are revealed. The invention takes advantage of the scale system's uniformity, using standard whole- and half-step progressions, grouped by musical key. Thus the student has both a visually stimulating queue and a consistent pattern from which to easily learn the desired combination while sitting at the keyboard and actually playing the particular keys identified by the invention in proper combination and sequence.

In fact the vast majority of students are taught the musical principles previously discussed by referencing written musical notation on the Grand Staff. The disclosed invention is a completely novel way of teaching these principles to students of keyboard music while they are sitting at the keyboard and actually playing the instrument. This is a significant benefit to beginning students of keyboard music, since beginning students have yet to master the reading of musical notation on the grand staff, and are therefore very limited in what they can play on the keyboard. This limitation impairs a new students ability to work on their keyboard technique. With the present invention, a new student can immediately begin practicing these technique skills, while at the same time unconsciously building recognition of the various musical patterns through both physical repetition and visual stimulation. Thus, the present invention makes it possible to teach a beginning student the scale system and proper keyboard technique before they even understand the concept of musical notation or how to read it. This is a significant improvement over prior art because the student is no longer limited by the student's lack of music reading ability, and can immediately begin learning the necessary technical skills from their very first lesson, using the disclosed invention.

A template, similarly placed behind the keyboard of a piano, is disclosed at http://www.keyboardchords.com and http://www.chordpiano.com, both of which are owned and operated by Keyboard Workshop, Box 700, Medford, Oreg. 97501. The template by Keyboard Workshop is merely a pictorial of the notes associated with each key on the keyboard, and does not teach or inform regarding the standardized groupings of keys as disclosed in the invention.

U.S. Pat. No. 2,663,211 to Wallace discloses a piano key indicator that is placed adjacent to the keys of the piano in order to teach a student the fingering positions in order to play scales on the instrument. The device is composed of a three-part slide-rule mechanism that must be adjusted by the user to indicate which keys are to be utilized for any given scale.

U.S. Pat. No. 3,728,931 to Leonard discloses a slider for determining scale tones from any root tone, but is a visual device that is not placed adjacent to the keys to denote actual finger placement, but rather is a study tool for learning key positions.

U.S. Pat. No. 4,969,383 to Bezeau discloses a two-piece device, composed of a printed base and a transparent overlay that can also to be used as a study tool for finding the appropriate notes to be played. It functions with multiple instruments and displays the finger positions used for a selected scale, as well as those that are tonically related to the selected scale.

U.S. Pat. No. 5,029,507 also to Bezeau, is an improvement to the device disclosed in U.S. Pat. No. 4,969,383. It adds a second transparent overlay that indicates appropriate chords for the selected scale.

Most of the above-identified alternative inventions only comprise a picture of the relevant keys as a visual aid, not a template placed behind a keyboard for instant instruction. The ones that are templates are not comparable to the present invention because they only identify a particular set of notes to be played for an identified chord or progression. The instant invention reveals a uniform, movable pattern that can be used for ALL similar scales, chords or progressions.

SUMMARY OF THE INVENTION

In operation one uses the invention by placing it behind the keyboard of a piano or other keyboard instrument so that it highlights the applicable keys for any standardized combination of notes, making it possible for the correct notes to be played. The student may then focus on technical fluency and speed. Later, as the beginner becomes more competent in reading and writing musical notation, he/she can connect the keyboard skills he/she has become proficient in (through use of the invention) to the written musical notations.

The invention has several improvements over existing devices. First, the invention is simple to use. It does not involve any sliding or moving parts, and thus cannot supply misinformation due to improper usage.

Secondly, the user needs only one template in order to play the particular type of scale or chord regardless of the desired base key.

Third, the invention serves as a very visible and direct cue to the student, particularly students that might have a visual impairment and thus might not be able to see the intricate notations on other devices.

These and other objects of the invention will become clear to one of ordinary skill in the art after reviewing the disclosure of the invention that follows.

DETAILED DESCRIPTION OF THE INVENTION

Figure 1:
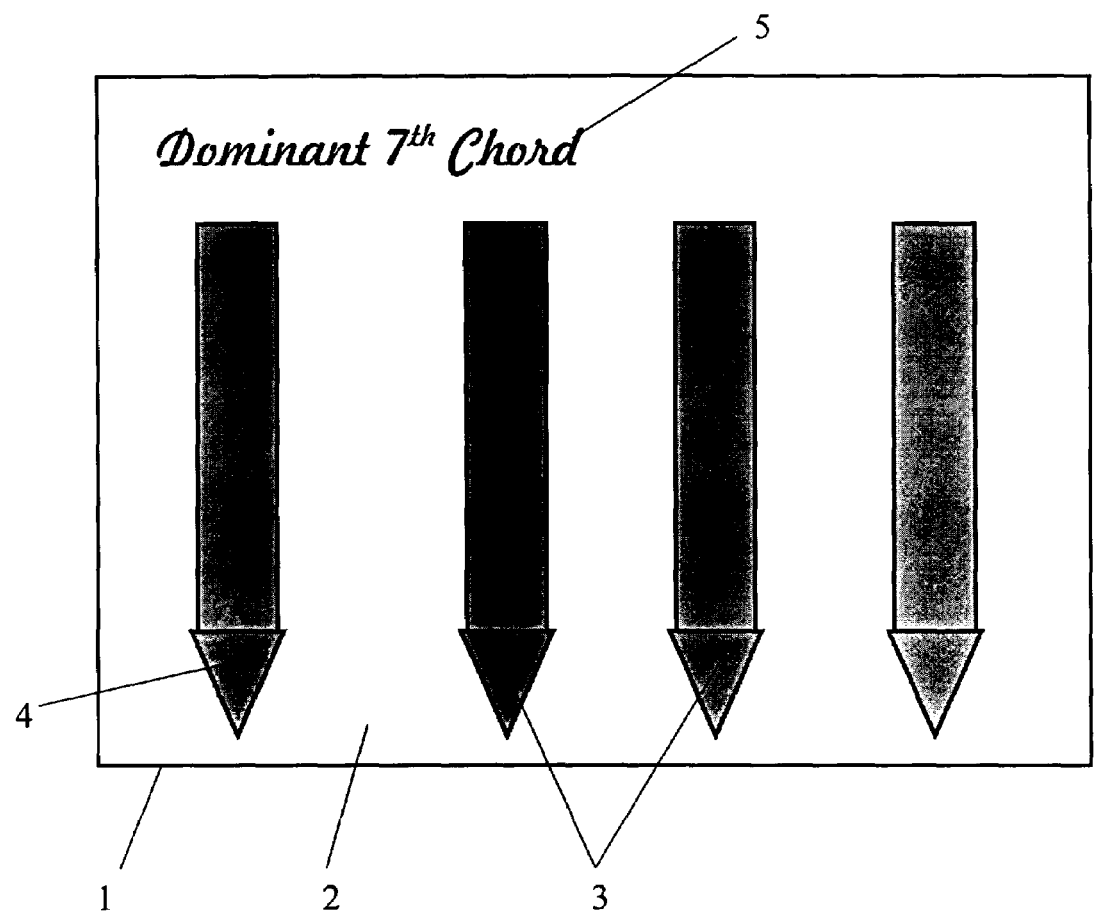
FIG. 1 is a top view of one implementation of the invention for the Dominant 7$^{th}$ Chord.

FIG. 1 is a top view looking down on one embodiment of the invention. The invention is composed of a base [1] with a flat surface [2], upon which have been placed first indicia [3] marking a fingering pattern for use on a musical keyboard. The number of indicia and their spacing are determined such that the indicia always point to the correct keys to play for the selected scale, five-finger pattern, chord, inversion of chord, or first chord of a cadence, no matter where on the keyboard the invention is placed. The indicium farthest to the left [4] indicates the lead key for the scale, five-finger pattern, chord, or inversion of chord that is being played with the invention in its current placement on the keyboard. The label [5] specifies which musical pattern is being indicated, in the present embodiment a Dominant 7th Chord.

Figure 2:
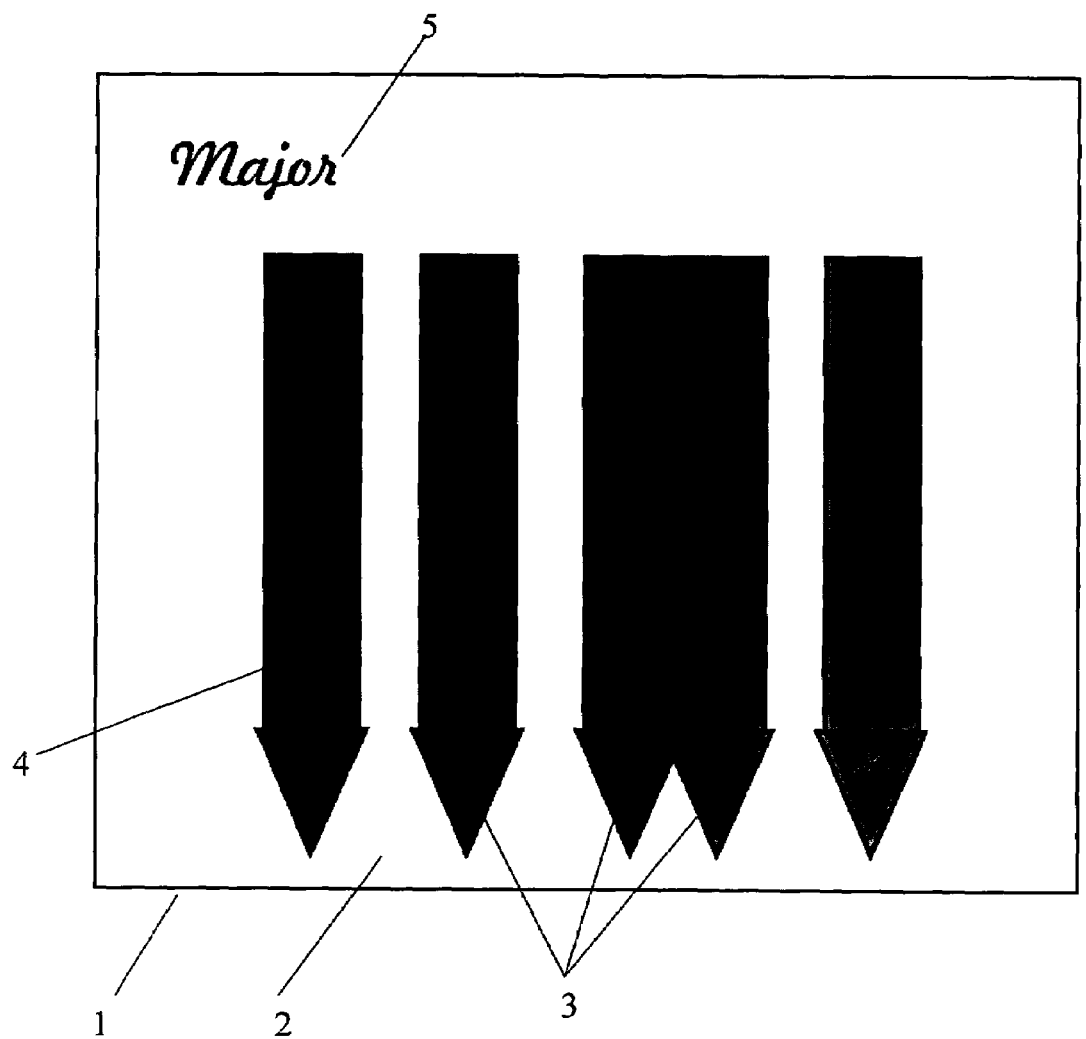
FIG. 2 is a top view of one implementation of the invention for the Major Five Finger Pattern.

FIG. 2 is a top view looking down on another embodiment of the invention, with the same elements as depicted in FIG. 1. The number of and spacing of the first indicia [3] have been changed to comprise the fingering pattern for a Major Five Finger Pattern, and the label [5] has been changed accordingly.

Figure 3:
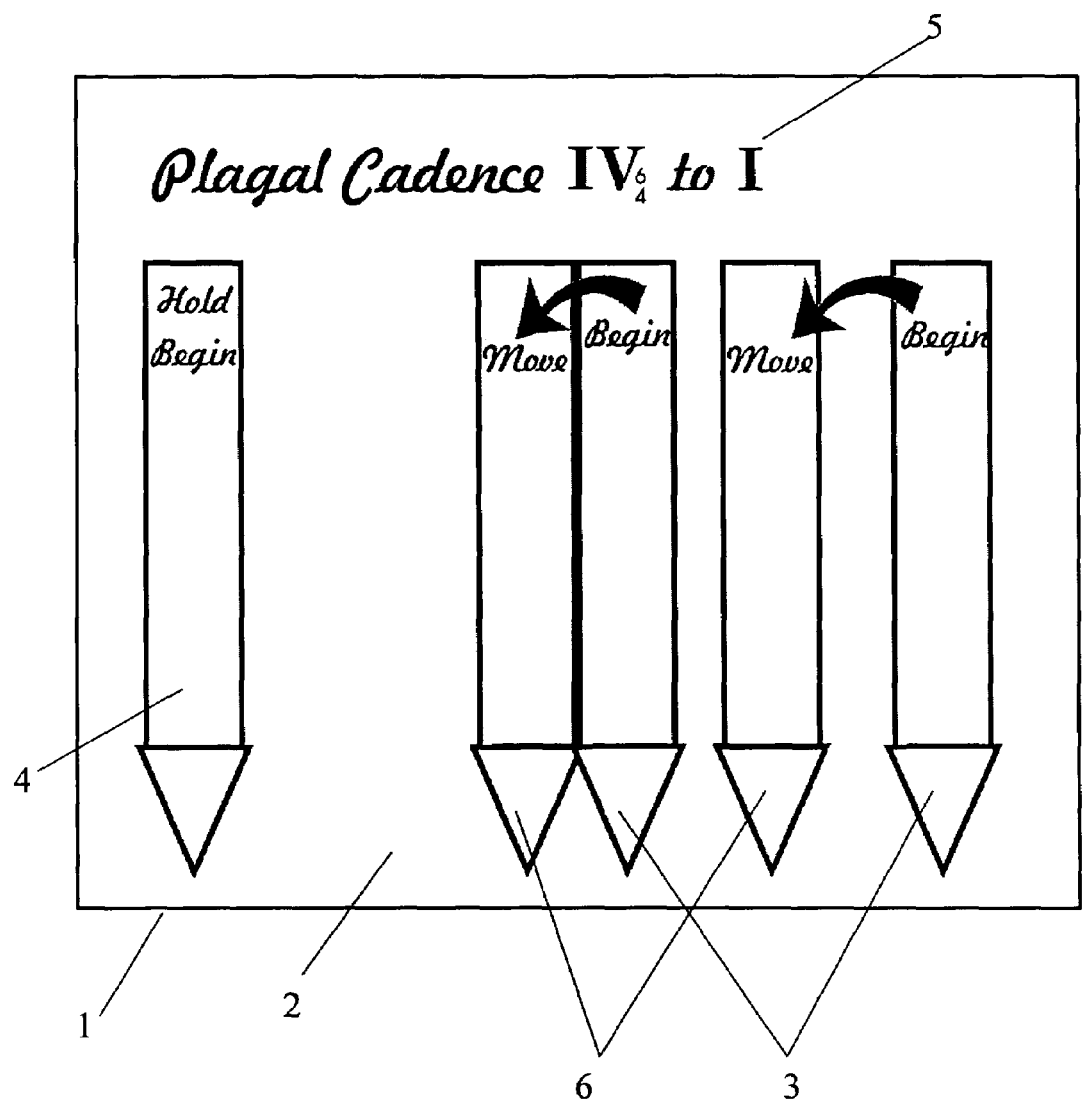
FIG. 3 is a top view of one implementation of the invention for the Plagal Cadence.

FIG. 3 is a top view looking down on another embodiment of the invention with the same elements as depicted in FIGS. 1 and 2, plus an additional element applicable only to cadences. This embodiment shows cadences, wherein the first indicia [3] show the initial finger positions for the first chord to be played, and the second indicia [6] show the changed finger positions for the second chord to be played.

While several embodiments of the invention have been described, variations and modifications would be apparent to one of ordinary skill in the art without departing from the scope of the invention. The invention is defined by the appended claims.

I claim:

1. A musical keyboard pattern indicator comprising:
a base having a first flat surface, said first flat surface having a first indicia placed thereon at pre-determined whole- and half-step intervals forming a pre-selected standard musical pattern that indicates fingering placement for playing the pre-selected musical pattern in a non-pre-selected musical key, and a label specifying the pre-selected musical pattern, wherein said base is movably placed above or behind the keys on a keyboard musical instrument so that the left-most first indicia indicates the non-pre-selected musical key, and the other indicia indicate the remaining notes for the pre-selected musical pattern.

2. The musical keyboard pattern indicator of claim 1, wherein said base is capable of being non-permanently affixed above or behind the keys on a keyboard musical instrument.

3. The musical keyboard pattern indicator of claim 1, wherein said indicia is colored differently for each musical pattern.

4. The musical keyboard pattern indicator of claim 2, wherein said indicia is colored differently for each musical pattern.

5. A musical keyboard pattern indicator comprising:
a base having a first flat surface, said first flat surface having a first indicia placed thereon at pre-determined whole- and half-step intervals forming a pre-selected standard musical pattern that indicates fingering placement for playing the pre-selected musical pattern in a non-pre-selected musical key, a second indicia placed thereon at pre-determined whole- and half-step intervals forming a second related pre-selected standard musical pattern that indicates fingering placement for playing the second related pre-selected standard musical pattern in the same non-pre-selected musical key, and a label specifying the pre-selected musical patterns, wherein said base is movably placed above or behind the keys on a keyboard musical instrument so that the left-most first indicia indicates the non-pre-selected musical key, and the other indicia indicate the remaining notes for the pre-selected musical pattern.

6. The musical keyboard pattern indicator of claim 5, wherein said base is capable of being non-permanently affixed above or behind the keys on a keyboard musical instrument.

7. The musical keyboard pattern indicator of claim 5, wherein said indicia is colored differently for each musical pattern.

8. The musical keyboard pattern indicator of claim 6, wherein said indicia is colored differently for each musical pattern.

* * * * *